US009437070B2

(12) United States Patent
Marincola et al.

(10) Patent No.: US 9,437,070 B2
(45) Date of Patent: Sep. 6, 2016

(54) SOLAR LIGHTING WITH PAY-AS-YOU GO TECHNOLOGY

(71) Applicant: Angaza Design, Inc., Redwood City, CA (US)

(72) Inventors: Lesley Silverthorn Marincola, Redwood City, CA (US); Bryan Silverthorn, Palo Alto, CA (US); Victoria Arch, San Francisco, CA (US); Lee Silverthorn, Paradise Valley, AZ (US); Joshua Milburn, Oakland, CA (US); William Tsai, New York, NY (US); Eric Thorne, San Francisco, CA (US)

(73) Assignee: Angaza Design, Inc., Redwood City, CA (US)

( * ) Notice: Subject to any disclaimer, the term of this patent is extended or adjusted under 35 U.S.C. 154(b) by 0 days.

(21) Appl. No.: 14/662,077

(22) Filed: Mar. 18, 2015

(65) Prior Publication Data

US 2015/0287263 A1    Oct. 8, 2015

Related U.S. Application Data

(60) Provisional application No. 61/974,288, filed on Apr. 2, 2014, provisional application No. 62/082,521, filed on Nov. 20, 2014.

(51) Int. Cl.
*H03C 3/00* (2006.01)
*G07F 15/00* (2006.01)
(Continued)

(52) U.S. Cl.
CPC ........... *G07F 15/006* (2013.01); *G06Q 20/145* (2013.01); *G06Q 20/3223* (2013.01);
(Continued)

(58) Field of Classification Search
CPC ..... G07F 15/006; H04L 27/10; H04L 25/06; G06Q 20/40; G06Q 20/145; H02J 7/35; H01B 7/02; H04M 17/202; H04M 1/0202; H04M 17/35; H04B 3/60
USPC ........................................................ 375/303
See application file for complete search history.

(56) References Cited

U.S. PATENT DOCUMENTS 4,326,102 A    4/1982   Culp et al.
6,745,106 B2   6/2004   Howard et al.
(Continued)

FOREIGN PATENT DOCUMENTS

EP        1 755 242        2/2007

OTHER PUBLICATIONS

Anna. (Sep. 28, 2011). "Solaraid Partners with Eight19 in 'Pay-As-You-Go' Solar Trial," located at <http://old.solar-aid.org/about/2011/09/solaraid-is-thrilled-to-be.html?url=/about/2011/09/solaraid-is-thrilled-to-be.html> visited on May 14, 2013. (3 pages).

(Continued)

*Primary Examiner* — Juan A Torres
(74) *Attorney, Agent, or Firm* — Morrison & Foerster LLP

(57) ABSTRACT

Disclosed are systems, devices and methods for providing solar lighting and power to a customer by using pay-as-you-go (PAYG) technology. The PAYG technology allows a customer to make incremental payments for a solar energy system that includes a lighting unit. The payments can be made through a smartphone. A cable is used to connect an audio jack of the smartphone and a PV power jack of the lighting unit. Analog AC signals including data about activation, payment, usage and status are transmitted over the cable between the service provider and lighting unit, through a smartphone. The power jack of the lighting unit is also used to connect to a solar panel of a charging unit and a battery of the lighting unit.

17 Claims, 11 Drawing Sheets

(51) Int. Cl.
*G06Q 20/14* (2012.01)
*G06Q 20/40* (2012.01)
*H01B 7/02* (2006.01)
*H02J 7/35* (2006.01)
*H04B 3/60* (2006.01)
*H04L 25/06* (2006.01)
*H04L 27/10* (2006.01)
*H04M 1/02* (2006.01)
*H04M 1/725* (2006.01)
*G06Q 20/32* (2012.01)
*H04M 17/00* (2006.01)
*H04M 15/00* (2006.01)
*H04M 1/60* (2006.01)

(52) U.S. Cl.
CPC ............ G06Q20/40 (2013.01); H01B 7/02 (2013.01); H02J 7/35 (2013.01); H04B 3/60 (2013.01); H04L 25/06 (2013.01); H04L 27/10 (2013.01); H04M 1/0202 (2013.01); H04M 1/72527 (2013.01); *H04M 1/0274* (2013.01); *H04M 1/6058* (2013.01); *H04M 15/68* (2013.01); *H04M 17/202* (2013.01); *H04M 17/35* (2013.01); *Y04S 50/12* (2013.01)

(56) References Cited

U.S. PATENT DOCUMENTS

| | | |
|---|---|---|
| 7,035,719 B2 | 4/2006 | Howard et al. |
| 7,098,772 B2 | 8/2006 | Cohen |
| 7,362,213 B2 | 4/2008 | Cohen |
| 8,543,505 B2 | 9/2013 | Pederson |
| 2002/0128932 A1 | 9/2002 | Yung et al. |
| 2002/0194468 A1 | 12/2002 | Betts-LaCroix et al. |
| 2003/0045968 A1 | 3/2003 | Howard et al. |
| 2004/0199299 A1 | 10/2004 | Howard et al. |
| 2005/0131810 A1 | 6/2005 | Garrett |
| 2006/0136544 A1 | 6/2006 | Atsmon et al. |
| 2006/0240890 A1 | 10/2006 | Walker et al. |
| 2007/0053365 A1 | 3/2007 | Choi |
| 2007/0061268 A1 | 3/2007 | Herold et al. |
| 2007/0083479 A1 | 4/2007 | Swartz et al. |
| 2008/0177678 A1 | 7/2008 | Di Martini et al. |
| 2008/0183307 A1 | 7/2008 | Clayton et al. |
| 2008/0319908 A1 | 12/2008 | Venkatachalam et al. |
| 2009/0096413 A1 | 4/2009 | Partovi et al. |
| 2009/0104874 A1 | 4/2009 | Ellis |
| 2009/0196016 A1 | 8/2009 | Massara et al. |
| 2009/0315485 A1 | 12/2009 | Verfuerth et al. |
| 2010/0030838 A1 | 2/2010 | Atsmon et al. |
| 2010/0094476 A1 | 4/2010 | Hamilton, II et al. |
| 2010/0114679 A1 | 5/2010 | Pan |
| 2010/0141153 A1 | 6/2010 | Recker et al. |
| 2010/0217549 A1 | 8/2010 | Galvin et al. |
| 2010/0271802 A1 | 10/2010 | Recker et al. |
| 2011/0270764 A1 | 11/2011 | Mizani Oskui |
| 2011/0288992 A1 | 11/2011 | Needham et al. |
| 2011/0295706 A1 | 12/2011 | Urquhart |
| 2012/0011007 A1 | 1/2012 | Blewett et al. |
| 2012/0080944 A1 | 4/2012 | Recker et al. |
| 2012/0112544 A1 | 5/2012 | Salcone |
| 2012/0197806 A1 | 8/2012 | Hill |
| 2012/0232714 A1 | 9/2012 | Ricket |
| 2012/0256585 A1 | 10/2012 | Partovi et al. |
| 2013/0013490 A1 | 1/2013 | Keller et al. |
| 2013/0095754 A1* | 4/2013 | Moreton ............ G06Q 20/3226 455/41.1 |
| 2013/0132267 A1 | 5/2013 | Moore et al. |
| 2013/0185194 A1 | 7/2013 | Moore et al. |
| 2014/0054963 A1 | 2/2014 | Spitchka et al. |
| 2014/0168985 A1 | 6/2014 | Chien |

OTHER PUBLICATIONS

Elgan, M. (Jul. 28, 2012). "A new app lets you send pictures via sound," located at <http://www.computerworld.com/s/article/9229723/A_new_app_lets_you_send_pictures_via_sound?taxonomyId=77&pageNumber=1> visited on May 14, 2013. (4 pages).

Fairley, P. (Dec. 2004). "Lighting up the Andes," *IEEE Spectrum* 41(12): 44-49.

Gopalan, K. et al. (2004). "Audio Steganography for Covert Data Transmission by Imperceptible Tone Insertion," *Communication Systems and Applications*: 1-5.

Holland et al. (Jul.-Aug. 2001). "Decentralised Rural Electrification: Critical Success Factors and Experiences of an NGO," *Refocus* 2(6): 28-31.

Iannacci, F. et al. (Jun. 5, 2010). "ChirpCast: Data Transmission via Audio," located at <http://www.cs.washington.edu/education/courses/cse561/10sp/projects.html> visited on May 14, 2013. (7 pages).

Prandoni, P. (1998) "Perceptually Hidden Data Transmission Over Audio Signals," *Acoustics, Speech, and Signal Processing* 6(6): 3665-3668.

Robin, B. (May-Jun. 2006). "Subsidised Solar Lighting: The Only Option for 1 Billion People," *Refocus* 7(3): 36-39.

Ulbricht, M. (Jun. 13, 2011). "SharedSolar: Mobiles and Micro-Grids for More Efficient Energy," located at < http://web.archive.org/web/20110617072506/http://mobileactive.org/case-studies/SharedSolar-mobiles-and-micro-grids> visited on May 14, 2013. (5 pages).

Texas Prepaid Electricity—Texas No Deposit Electricity. (2011). "We Have the Answer: Get SmarTricity with Flex Pay," located at <http://www.paylesspower.com/prepaid_electricity.aspx> visited on May 14, 2013. (2 pages).

International Search Report and Written Opinion mailed Mar. 25, 2013, directed to International Application No. PCT/US12/71043; 9 pages.

Marincola et al., U.S. Office Action mailed Jul. 7, 2014, directed to U.S. Appl. No. 13/722,197; 23 pages.

Marincola et al., U.S. Office Action mailed Nov. 4, 2014, directed to U.S. Appl. No. 13/722,197; 28 pages.

Marincola et al., U.S. Office Action mailed Jul. 28, 2015, directed to U.S. Appl. No. 13/722,197; 38 pages.

* cited by examiner

SOLAR LIGHTING WITH PAY-AS-YOU GO TECHNOLOGY

CROSS-REFERENCE TO RELATED APPLICATIONS

This application claims the benefit of U.S. Provisional Application Ser. No. 61/974,288, filed Apr. 2, 2014, and U.S. Provisional Application Ser. No. 62/082,521, filed Nov. 20, 2014, the entire contents of which are incorporated herein by reference.

FIELD OF THE INVENTION

This invention relates to devices and methods for providing lighting and power to a customer by using pay-as-you-go (PAYG) technology. In particular, a PAYG device can include a cable that facilitates communications with a smartphone operated by a customer, or operated by an agent who manages transactions for multiple customers.

BACKGROUND OF THE INVENTION

More than 1.5 billion people lack access to electricity. This fraction of the global population is off-grid, and is referred to as the base of the socioeconomic pyramid. The "base of the pyramid" includes more than 4 billion people that spend up to 30% of household income on expensive batteries and low-quality, dangerous fuel-based sources of light, such as kerosene, to meet their energy needs. Families in these households inhale toxic kerosene fumes on a nightly basis. Moreover, children struggle to study because they rely on using dim kerosene light.

Many off-grid households in these markets own cellular phones that are commonly referred to as "feature phones" (e.g., Nokia brick phones), which cannot run third party software applications. Off-grid "base of the pyramid" families may travel hours to charge their consumer electronics, such as cellular phones, from the nearest source of grid electricity, often paying very high prices to do so. Distributed solar energy products can provide in-home lighting and power resources to solve this problem; however, off-grid "base of the pyramid" customers rarely have enough cash on hand at one time to purchase their own solar home system outright at retail prices.

Traditional leasing or cash collection programs for solar home energy systems have proven too costly or difficult to manage to effectively scale. The growth of mobile money platforms and extensive cellular infrastructure throughout many off-grid markets presents an opportunity to leverage this infrastructure to inexpensively and securely provide financing for solar home systems at scale, using pay-as-you-go (PAYG) technology. However, methods for communicating payments and diagnostic data for PAYG electronic devices tend to be unsecure and unreliable. Accordingly, a need exists for a secure way to provide light and energy to "base of the pyramid" households with a Pay-As-You-Go pricing structure.

Mobile money payment systems are known. For example, U.S. Patent Publication No. 2011/0270764 describes a system for performing electronic transactions using a point of sales device and a user's cellular phone. However, this application does not describe a customer using a cable to physically connect a jack on an energy device or appliance to an audio jack on a mobile phone for transferring data, or for management and monitoring of the energy device. This application also does not describe the customer using the same jack on the energy device to accept a solar panel plug, or other energy source, to charge a battery in the energy device. Moreover, this application does not describe a network of agents that can facilitate transactions between multiple customers and a service provider.

SUMMARY OF THE INVENTION

Providing households with access to energy in developing countries is problematic for many reasons. First, the most immediate way to provide access to energy is through off-grid devices that do not require large-scale infrastructure. Second, scaling off-grid energy access in developing countries requires simple customer financing and high-performance, high-quality solar energy products. Third, scaling off-grid energy access is often challenging due to the high cost of distribution in remote off-grid areas (commonly referred to as the "last mile"), thereby reducing profit margins. Fourth, energy service providers lack an effective way to manage and monitor off-grid solar energy products. Finally, solar energy products lack a simple way to reliably accept electrical power and communicate with external devices.

The inventors have developed the disclosed pay-as-you-go (PAYG) solar energy devices that can be physically connected to mobile phones by using a cable. The disclosed cable-based PAYG device uses cellular or other wireless networks (e.g., data networks) to transmit information from a service provider to a smartphone, like an ANDROID smartphone, that runs third party client-side applications. Data is then transmitted from the smartphone to a solar energy device over the cable. In some embodiments, the mobile phones are operated by customers or agents that service multiple customers.

A customer or agent uses a smartphone to "top-up" their solar energy device. A top-up process refers to making payments to keep a solar energy device active. Although service providers may use an agent equipped with the smartphone and cable to facilitate top-up synchronization ("sync"), some embodiments do not require agents. As long as a customer has access to a smartphone running a client-side application to access the service provider, the customer can sync a solar energy device with the service provider's backend system to apply payment information to the device. As smartphones become increasingly popular, customers may have access to their own smartphones or they may have access to a neighbor's smartphone to top-up their solar energy devices. In some embodiments, the client-side application can be made available for download to the public through conventional application stores, accessible through smartphones.

In some embodiments, there is a relationship between the service provider's backend system and client-side application data, and the client-side application running on a smartphone and data from a solar energy device; however, this relationship may not be a one-to-one correspondence. Accordingly, this data may be manipulated or modulated at the client-side application in between the solar energy device and backend system.

Cable-based PAYG may implement any of the following processes to top-up a solar energy device: (1) a customer may carry a solar energy device to an agent who performs the top-up process, which is mostly feasible for portable units or fixed units with a removable, portable "top-up box"; (2) the customer may have a smartphone and can perform the top-up process using the phone by downloading the client-side application from an application store, or the distributor may bundle a smartphone with the application with the cost of a solar energy device; (3) a roaming agent may travel around a community of customer homes to perform top-ups; or (4) local MPESA (payment) agents can be trained to be top-up agents and be equipped with smartphones and cables so that customers can make an MPESA payment and top-up from the same agent.

The disclosed PAYG solar energy devices may be sold to customers at a low upfront cost and can be paid for incrementally over time as customers consume energy (e.g., pre-paid) to furnish a source of light and power to the rural off-grid market segment. Using the disclosed cable to connect a jack on a solar energy device to an audio jack of a smartphone results in secure and reliable bidirectional communications that facilitate management and monitoring. The same jack on the solar energy device can be used to connect to a solar panel to charge an internal battery in the solar energy device. In addition, using an agent to manage multiple solar energy devices can help expand use to off-grid market customers that do not own smartphones supporting third party client-side applications. Therefore, agents can be equipped with smartphones that can run the appropriate client-side application.

In some embodiments, solar energy devices are monitored by a service provider. Each solar energy device can communicate with the service provider over a network, through another device such as a smartphone. A solar energy device may connect to a smartphone operated by an agent of a service provider or other distributor by using a cable. Communications between the solar energy device and the smartphone may include analog AC signals that are used to conduct various transactions. The agents may be geographically dispersed to regional hubs. Each agent facilitates communications between a service provider and multiple solar energy devices in a particular geographic region.

In some embodiments, a customer initially pays an upfront cost (e.g., down payment) to an agent to purchase "energy credit" that activates his or her solar energy device. The down payment is the price a customer may pay to walk away with the solar device. In some embodiments, the service provider may choose to include a "free week of energy" with the down payment. Thereafter, the customers may purchase the energy they use, either priced by time or by usage.

In some embodiments, the customer can use existing mobile money infrastructure to send a service provider an electronic payment via USSD, SMS, SIM Application Toolkit (STK), or any other protocols. Once a service provider receives a payment, a data transmission can be made available to a customer's mobile telephone. The customer may connect his or her mobile phone to the customer's solar energy device by, for example, using the cable. The data is transmitted to the customer's solar energy device over the cable to provide energy credit. Moreover, data about diagnostic information is transmitted from the customer's solar energy device to the customer's mobile phone over the same cable, for example. The data provided from the customer's solar energy device can then be transmitted to the service provider over the cellular network. In some embodiments, an agent can provide these same services to many customers.

Specifically, a customer may connect an end of the cable to a jack on a solar energy device. This jack may be a 2-channel jack, similar to a barrel connector. The customer may connect the other end of the cable to an audio jack of a smartphone. The customer may then use a client-side application running on the smartphone to conduct transactions between the service provider and the solar energy device. These transactions include, for example, activating the solar energy device and accepting payments to keep the device active. In addition, the same jack on the solar energy device may be used to connect to a solar panel, to charge a battery in the solar energy device.

Analog AC signals may be transmitted over the cable between a smartphone and a solar energy device. Frequency-Shift Keying (FSK) technology may be used to produce a transmission of information as discrete frequency changes in the AC signals. A microprocessor within the solar energy device may decode data embedded in the AC signals to activate the device for a period of time. In some embodiments, memory within the solar energy device stores usage and diagnostic data. The microprocessor can encode the usage and diagnostic data into data signals that are transmitted to the service provider by using the cable connected to the smartphone.

The service provider can monitor and track solar energy devices based on data received therefrom. The data can be used for troubleshooting, maintenance and repairs. In some embodiments, data may include alerts that notify agents about detected problems. For example, agents can troubleshoot solar energy devices by replacing failing batteries. In some embodiments, alerts can be sent as SMS text messages to an agent associated with a customer's solar energy device or account number. In some embodiments, tracked data may include times of use per day, operating efficiency, and the like. This data could be used to design future products based on typical household use. In addition, usage data can provide proof to qualify for carbon credit programs because the solar energy devices replace kerosene devices. In addition, repayment data can be used to build an unbanked customer's credit history to enable them to access additional financing for larger solar products or other uses.

In some embodiments, a pay-as-you-go apparatus includes a battery for storing electrical power, and a jack configured to receive electrical power generated by a solar panel and facilitate bidirectional communications between the pay-as-you-go apparatus and a smartphone. The received electrical power is stored in the battery. In some embodiments, the pay-as-you-go apparatus includes an amplifier that converts an analog signal received from the smartphone into multiple digital pulses by collapsing areas of the analog signal that are below a first voltage threshold and raising areas of the analog signal that are above a second voltage threshold, a microcontroller that decodes data encoded as the plurality of digital pulses by measuring a width of each digital pulse to determine a bit value, and a switch controlled by the microcontroller to attenuate a signal transmitted by the smartphone during periodic time intervals, wherein the smartphone detects the attenuation through a microphone channel that is connected to a speaker channel of a cable connected to the jack.

In some embodiments, the bidirectional communications are transmitted over a single conductor of the cable by employing the switch to permit transmission in a first direction when the switch is in a first position and permit transmission in a second direction when the switch is in a second position. The first direction is opposite of the second direction. In some embodiments, frequency-shift keying (FSK) modulation is employed for transmission in the first direction, and cooperative amplitude-shift keying (ASK) modulation is employed for transmission in the second direction.

In some embodiments, a first cable is used to connect the pay-as-you-go apparatus to the solar panel and a second cable is used to connect the pay-as-you-go apparatus to the smartphone. The first and second cable may be different or combined. In some embodiments, the second cable includes a first end configured to connect to the jack of the pay-as-you-go apparatus and includes only two conductors, and a second end configured to connect to an audio jack of the smartphone and comprising three or more conductors. In some embodiments, the first end is a photovoltaic plug with spring contacts. In some embodiments, the second end is a tip-ring-ring-sleeve (TRRS) connector.

In some embodiments, the tip conductor is electrically connected to a center conductor of the photovoltaic plug, one of the two ring conductors is electrically connected to an outer conductor of the photovoltaic plug, and the sleeve conductor is electrically connected to the center conductor of the photovoltaic plug. In some embodiments, a resistor is inserted between the sleeve conductor and the central conductor.

In some embodiments, the pay-as-you-go apparatus further includes a microprocessor configured to produce and interpret analog AC signals for communicating with a provider system through the second cable connected to the smartphone, and a power module configured to provide power to a device. The device comprises a lighting unit or an electrical outlet. In some embodiments, the pay-as-you-go apparatus further includes a control system configured to enable the pay-as-you-go apparatus, when activated with usage credits, to monitor usage of the pay-as-you-go apparatus, track remaining usage credits, and disable the pay-as-you-go apparatus when there are no remaining usage credits. In some embodiments, the pay-as-you-go apparatus is configured to communicate with the provider system using an application on the smartphone.

In some embodiments, a cable for communicating analog AC signals between a mobile telephone and a pay-as-you-go solar power device includes a first connecting end configured to connect to a jack of a pay-as-you-go solar power device and includes a center conductor and an outer conductor, and a second connecting end configured to connect to an audio jack of a mobile telephone and comprising two or more conductors. In some embodiments, the second connecting end of the cable is a tip-ring-ring-sleeve connector. In some embodiments, the first connecting end of the cable is a photovoltaic plug with spring contacts.

In some embodiments, the tip conductor is electrically connected to the center conductor of the photovoltaic plug, one of the two ring conductors is electrically connected to the outer conductor of the photovoltaic plug, and the sleeve conductor is electrically connected to the center conductor of the photovoltaic plug. In some embodiments, a resistor is inserted between the sleeve conductor and the central conductor. In some embodiments, the resistor is equal to or greater than 3 k Ohms.

In some embodiments a hybrid cable is used to connect the pay-as-you-go apparatus to the smartphone. In some embodiments, the hybrid cable includes an input connector comprising including a first conducting portion for transmitting a first signal, a second conducting portion for transmitting a second signal or a ground signal, and a third conducting portion for transmitting the second signal or the ground signal. In some embodiments, the hybrid cable includes an output connector including a fourth conducting portion for transmitting the first signal, and a fifth conducting portion for transmitting the ground signal. In some embodiments, the hybrid cable includes a circuit electrically connecting the first conducting portion to the fourth conducting portion and the first and second conducting portions to the fifth conducting portion and configured to transmit a ground signal from the second or third conducting portions to the fifth conducting portion.

In some embodiments, the second signal of the hybrid cable is a microphone signal. In some embodiments, the circuit of the hybrid cable is configured to transmit the second signal as a portion of the first signal. In some embodiments of the hybrid cable, the input connector further comprises a sixth conducting portion for transmitting a differential signal with the first conducting portion.

In some embodiments of the hybrid cable includes the input connector is a tip-ring-ring-sleeve connector. In some embodiments, the output connector is a photovoltaic plug with spring contacts.

In some embodiments of the hybrid cable, the first conducting portion and the third conducting portion are electrically connected to the fourth conducting portion, and the second conducting portion is directly electrically connected to the fifth conducting portion. In some embodiments, a first capacitor bridges the second and third conducting portions. In some embodiments, a first resistor is inserted between the first conducting portion and the fourth conducting portion, a second capacitor is inserted between the third conducting portion and the fourth conducting portion, and a second resistor bridges the second and third conducting portions. In some embodiments, the second resistor is equal to or greater than 3 kOhms and less than or equal to 10 kOhms; the first capacitor is equal to or greater than 10 microFarads and less than or equal to 100 microFarads; and the second capacitor is equal to or greater than 1 nanoFarad and less than or equal to 10,000 nanoFarads.

In some embodiments, a method of managing a plurality of pay-as-you-go lighting apparatuses includes receiving a payment message at a server. The payment message is sent from a mobile device operated by an agent that collects multiple payments from multiple customers. The method includes transmitting an encoded data message from the server to the mobile device. The encoded data message is for a pay-as-you-go lighting apparatus associated with one of the multiple customers. The method includes receiving a data message from the mobile device. In some embodiments, the received data message comprises data extracted from the lighting apparatus by using a cable that connects an audio jack of the mobile device to a photovoltaic jack of the lighting apparatus.

In some embodiments, the method further includes transmitting information from the mobile device to an electronic money system. The information includes service provider identification information, a customer account and a payment amount. The method further includes authorizing deduction of the payment amount from an account that is associated with the agent or customer.

DETAILED DESCRIPTION OF THE INVENTION

Described herein are systems, devices and methods for providing solar lighting and power to households by using pay-as-you-go (PAYG) technology. Although the total purchase price of solar systems is unaffordable to most households in developing countries, they can afford to make small payments over time. PAYG technology allows households to incrementally pay for lighting and power as they use their PAYG products.

Individual customers of PAYG products typically own cellular phones that are not able to connect with a service provider (e.g., "ANGAZA") to activate and make regular payments. Disclosed herein are also methods for customers to use mobile phones to facilitate transactions between customers and service providers. In some embodiments, the mobile phones used in the PAYG system are smartphones that can run third-party client-side applications to communicate with service providers. In some embodiments, agents may be disparately located to facilitate transactions between hundreds of customer households and service providers. An agent may use a client-side application on a smartphone to link different solar energy devices to a service provider. As an intermediary, the agent may collect aggregate data from solar energy devices and provide services to maintain and repair devices.

Establishing secure and reliable communications between a smartphone and a solar energy device ensures effective transactions to activate the device. Rather than using speakers and microphones within solar energy devices and cellular phones to communicate audible tones, described herein is a cable with a first end that plugs into a photovoltaic (PV) jack on the solar energy device and a second end that plugs into an audio jack on the smartphone. Cable-based PAYG utilizes the data connection of the smartphone for two-way communication to a servicer provider's backend system, whereas other PAYG devices require a voice call made to the customer's phone to play audible tones. This configuration provides secure and reliable communications between these devices because transmitted signals are less affected by ambient noise or other interferences. Energy credits are securely received by a solar energy device over the cable from a smartphone. The systems, devices and methods described herein allow customers to make incremental payments for solar energy devices over a secure and reliable cable that is connected to a smartphone.

A. Solar Energy System

Figure 1:
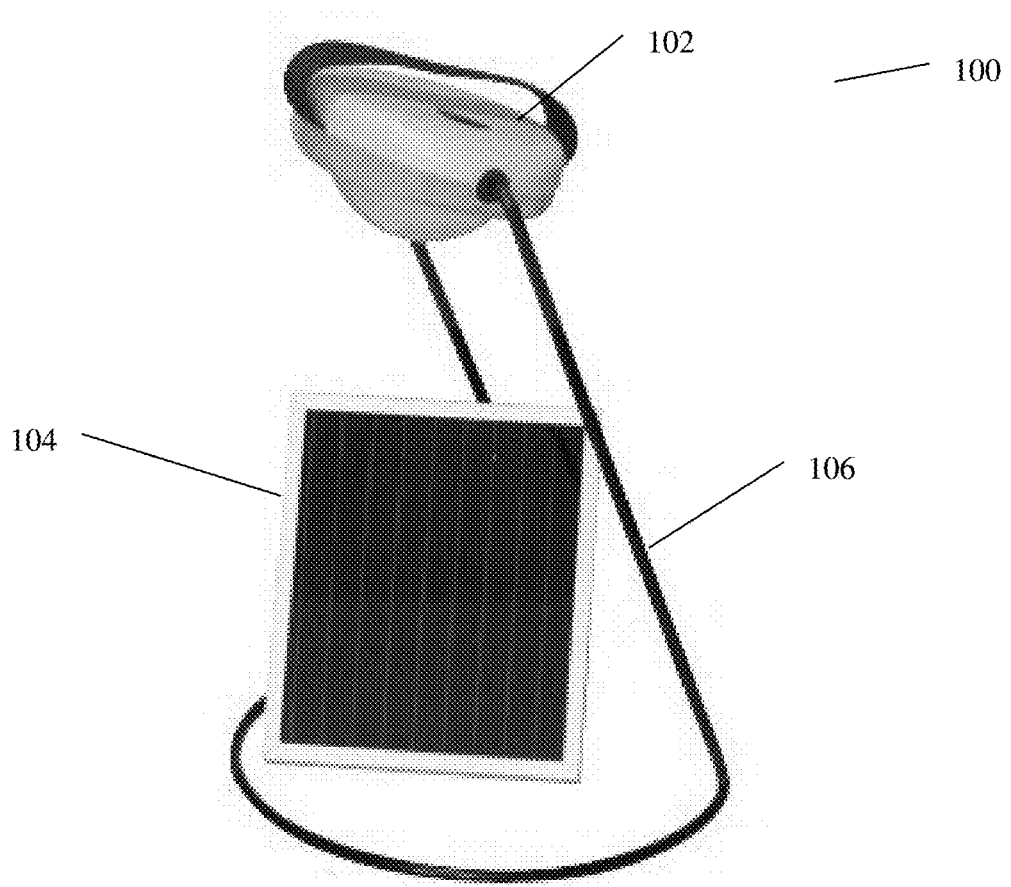
FIG. 1 is a diagram showing components of a solar energy system, according to some embodiments of the invention.

FIG. 1 shows components of solar energy system 100, which includes lighting unit 102, solar charging unit 104 and stand 106. Lighting unit 102 may be suspended by stand 106 by inserting its two ends into opposite sides of lighting unit 102. This permits lighting unit 102 to rotate and face different angles in a room.

Lighting unit 102 may include a two-channel photovoltaic (PV) jack, LED lights, rechargeable battery, USB jack that may be used for charging external devices like mobile phones, display screen, speaker and microphone. LED lights are preferred because they consume minimum power to illuminate a room. In some embodiments, fluorescent and incandescent lights are used. Lighting unit 102 may include a system control board, as detailed in U.S. application Ser. No. 13/722,197. The system control board may include a microcontroller, charging circuitry, LED drive and control circuitry, mobile phone charging circuitry, data control circuitry and the like. The system control board implements the PAYG features described herein.

Lighting unit 102 may include a rechargeable battery to power the LEDs to produce light. In some embodiments, energy credits purchased from a service provider may regulate times when a battery is charged, or regulate output from a battery that charges continuously. A microcontroller or microprocessor may control a battery charging circuit that includes a management component, which dictates when the battery is permitted to charge. For example, usage may be regulated by calendar time passed such that a customer can use the light unit as much or as little within a given timeframe (e.g., a week) but after that timeframe the light unit is deactivated.

Lighting unit 102 may include an LED driver module to control light output by the LED lights. For example, selectable light output settings control a magnitude of voltage applied to the LEDs. A fully charged lighting unit 102 may output hours of light on its brightest setting and twice as many hours on its lowest setting. Lighting unit 102 may be augmented to include a standard power outlet, USB port, adapter, or combinations thereof to permit a user to connect other electrical devices to lighting unit 102. In some embodiments, the LED lights are replaced entirely by power outlets.

Lighting unit 102 may provide different battery modes to optimize efficiency and power consumption. In some embodiments, battery life is managed by limiting power to portions of lighting unit 102 and/or limiting power to periods of time. Lighting unit 102 may use LEDs, a display screen, or a speaker to communicate available energy credits and/or current charge level of a battery. Lighting unit 102 may alert a customer when a predetermined threshold of these features has been exceeded. Alerts may be communicated with colors of light and/or audio tones. The display screen may provide diagnostic information for use by a customer or agent to service lighting unit 102.

Solar charging unit 104 includes a solar panel with solar cells that capture energy from the sun, and convert it to electricity that is used to charge the battery of lighting unit 102. One end of a cable connects to positive and negative terminals on solar charging unit 104 and the other end connects to a PV jack of lighting unit 102. In some embodiments, the cable may be a coaxial power connector with similar or different connecting ends. In some embodiments, solar panels may be daisy-chained together for multiple lighting units 102 for the same household or larger community centers, schools, and businesses.

B. Energy Credits

A service provider may operate a cloud-based backend system that receives payments from customers, transfers data to and from a device, encodes and decodes data from AC signals, builds a customer database including energy credits and payment profiles, and manages customer information. Data may be aggregated from different lighting units and stored at the backend system. The aggregated data may be used for analytics, such as calculating statistics about lighting units. The backend system may also issue refunds and provide notifications to agents.

Backend software can send and receive data messages to and from lighting unit 102. The messages can be decoded and acted upon using the same or different modulation schemes as those used at lighting unit 102. The information received from lighting unit 102 may include usage data, maintenance and diagnostic data, geographical location data, customer information, and the like. An administrative portal that connects to the backend system may provide a user interface to access data about lighting units and payments. The portal may also be used to manage lighting unit inventory, customer information, and allow for customizable pricing structures based on lighting unit serial numbers.

The service provider may issue purchased energy credits to a customer for lighting unit 102. Energy credits are used to activate lighting unit 102 and their depletion may deactivate lighting unit 102. Customers may purchase energy credits periodically throughout the entire life of lighting unit 102 to maintain the system active. In some embodiments, purchasing sufficient energy credits may maintain lighting unit 102 active indefinitely. In some embodiments, energy payments can be logged in the backend based on cash payments to a registered agent or dealer, or the purchase of physical scratch cards.

The system control board of lighting unit 102 may implement the PAYG technology by communicating with a service provider's server over a network, through a smartphone or other device such as a feature phone, laptop, or tablet. The microcontroller may use any audio-band or non-audio-band encoding scheme to implement PAYG, such as text messaging. Communication between the smartphone or other device and the service provider server may be conducted over a combination of networks including cellular, POTS, the Internet, VoIP, and the like.

The system control board may include a memory such as EEPROM to collect, log, and store information about lighting unit 102, including energy credit and consumption information. The data can be transferred through bidirectional communications to a smartphone over a cable, and then erased or modified from lighting unit 102 to make room for additional data storage. The data may be transferred to the service provider from the smartphone automatically and transparent to the agent. Collected data may also include temperature, efficiency, battery status, clock data, usage data, and brightness settings used.

Solar energy system 100 may meter energy consumed, such as energy consumed for light or as a power outlet, and for periods of use. Different types of metering provide different ways to market the lighting system based on different pricing schemes.

C. Registration Process

Figure 2:
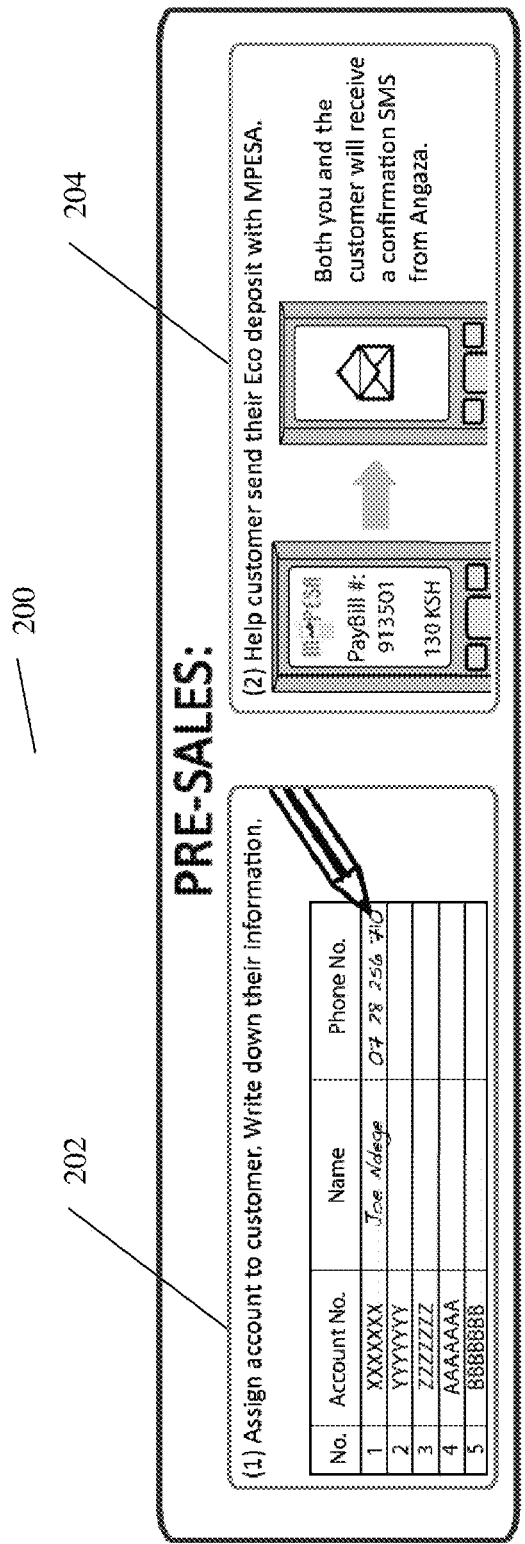
FIG. 2 is a flowchart showing a pre-sales registration process, according to some embodiments of the invention.

FIG. 2 is a flowchart showing pre-sales 200 of a registration process. In some embodiments, an agent of the service provider completes steps 202 and 204 for multiple customers. The agent can use a smartphone to communicate with the service provider, establish customer accounts, and maintain the accounts for the customers.

In step 202, an account may be assigned to a customer. An agent may record customer information, including name and contact information. A telephone number may be associated with a customer account. The telephone number may belong to the customer or agent. Multiple customer accounts may be associated with an agent.

In step 204, the customer makes a "down payment" to the service provider (e.g., "ANGAZA") server through a mobile money infrastructure. The agent may use a client-side application on a smartphone, or conventional cellular telephone that is enabled to communicate SMS text messages. In some embodiments, a GSM-enabled kiosk or device is used in lieu of a smartphone to manage multiple customers. The agent may input a PayBill number (i.e., a service provider's business reference number) and an amount of money when sending a mobile money payment using existing mobile money infrastructure. This information is sent to the service provider over a cellular network or other wireless network. In some embodiments, the down payment or subsequent energy payments are made from the agent's PayBill account on behalf of the customer. The specific device the energy payment is intended to be applied to may be denoted by a unique customer account number assigned to the customer at the point of sale. This account number may be input during the mobile money transaction process. In some embodiments, the service provider pays the agent a fee for conducting these transactions, or the agent may be compensated directly from a customer.

Figure 3:
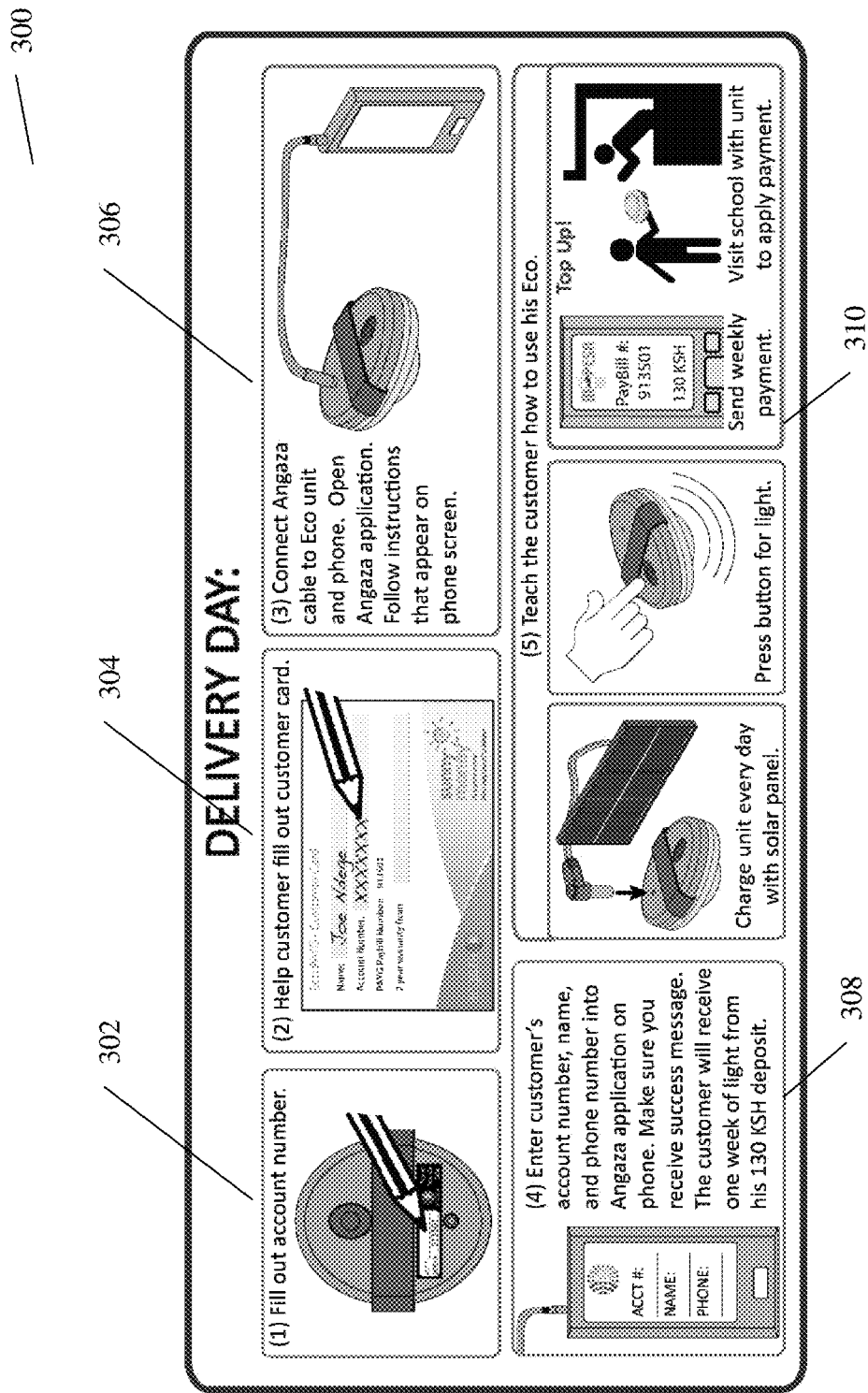
FIG. 3 is a flowchart showing a delivery-day registration process, according to some embodiments of the invention.

FIG. 3 is a flowchart showing delivery-day steps 300 of the registration process. In step 302, the customer or agent may write account information, including an account number, in designated fields on a label on the back of lighting unit 102. In step 304, the agent helps a customer complete a PAYG customer card that is retained by the agent to facilitate future payment transactions for the customer. In some embodiments, the service provider can include a "latent" account number with every unit that is pre-assigned at the production factory, so that at the point of sale, the customer uses that account number. In some embodiments, the service provider can dynamically assign account numbers at the point of sale. In step 306, a cable is used to connect the agent's smartphone to the customer's lighting unit 102. One end of the cable connects to the audio jack on the telephone, and the other end connects to the PV jack on lighting unit 102.

In some embodiments, the payment is deposited into the service provider's mobile money account and a payment receipt and/or confirmation message is transmitted to the agent's and/or customer's mobile phone. The confirmation message may be rendered on a smartphone application and/or received as an SMS text, and may indicate that a successful energy payment was made to the customer's account.

The service provider's server may include backend software that acknowledges collection of the mobile money payment and initiates a transfer of energy credits for a solar energy system 100 owned by the customer. In some embodiments, the service provider sends this data as an analog AC signal over the audio jack on the smartphone. The customer connects the cable between the smartphone and lighting unit 102 to transmit the energy credits. A first message from the service provider may activate lighting unit 102 for a period of time that corresponds to the purchased energy credit. During the same connection, the smartphone may receive usage and diagnostic information back from lighting unit 102, and then send that information to the service provider's server.

The registration process may log a discrete pairing between a telephone number, mobile money account, and a lighting system in a database at the service provider. In some embodiments, a pairing between an agent's smartphone and a lighting unit serial number is stored by the service provider as a one-to-one match. In some embodiments, a telephone number is not paired with a lighting unit. This allows the customer to use multiple agents to conduct transactions with a service provider. An agent may enter a lighting unit account number to make payments for a customer via a mobile money account. In some embodiments, identification information is transmitted from lighting unit 102 to the service provider, through a smartphone, as part of bidirectional communications.

In some embodiments, the "top-up" process is a two-step process. A customer can send a mobile money payment at any time by using existing mobile money platforms operated by local telecoms. The customer's solar energy device may determine the payment has been made after a "sync" process has been performed. The sync process includes using a cable to connect lighting unit 102 to a smartphone running the client-side application. The sync process may create a physical channel over which payment information is communicated to lighting unit 102, usage/diagnostic data is collected from internal storage on lighting unit 102, and all data is communicated with the service provider's backend system using the cellular network or data connection on a smartphone. The information may be transferred using the smartphone's connection over a country's cellular or wireless data networks. The client-side application running on a smartphone then encodes the data received from the service provider's server, sent over the network, into an analog AC signal that is transmitted over the cable to lighting unit 102.

The customer or agent may use a client-side application running on a smartphone to facilitate communication between lighting unit 102 and the service provider's server, through the smartphone. The phone may prompt the customer about steps required to complete the process, or the process may be completed automatically after the cable is plugged in. For example, in step 308, an agent enters a customer's account number, name and an associated telephone number into the application. A message is received from the service provider by the phone to confirm receipt of the electronic payment. Thus, for example, the customer will receive a week of light for a 130 KSH deposit. In step 310, the agent may teach a customer how to operate lighting system 100. This may include how to charge lighting unit 102 every day with solar charging unit 104, how to press a button to cause lighting unit 102 to output light, and how to send scheduled payments by visiting the agent.

The PAYG system may be implemented using various embodiments of point of sales that include a combination of an account, account number, hardware ID, and the like. An account is a group of details outlining the financing of a particular lighting unit, including the status of repayment and pricing information. Accounts may be grouped in different ways to reflect a particular sales channel, for example. An account may not be permanently tied to a lighting unit, and can be disassociated from one lighting unit and associated with another lighting unit, in the event of replacement, for example. If an account is transferred to a different lighting unit, all repayment information is preserved and applied to the other lighting unit. An account number is a sequence of numbers or letters that uniquely identifies an account. An account number may be paired to an account on the service provider's backend system. Account numbers may be used in consumer-facing materials so that a customer can identify himself and send payments to the correct account. A hardware ID is a unique identifying code assigned to a lighting unit at the point of production, and may be permanently paired with only that particular lighting unit.

In some embodiments, an account number may be associated with a specific hardware ID on the service provider's backend system before that lighting unit leaves the production factory (i.e., a latent account number). At the production factory, labels may be placed on the lighting unit housing and packaging to identify that account number pairing.

In some embodiments, a client-side application running on a smartphone may contain a login prompt to enable a customer or agent to run the client-side application. Login information is associated with a specific account on the service provider's backend system. For example, an agent's login information may be tied to a specific account created by the distributor on the service provider's backend system. That account may be associated with specific energy pricing information. Any lighting unit connected to the backend system through a client-side application using that agent's log-in information could use that pricing information.

In some embodiments, at the point of sale, lighting unit 102 may be connected with a cable to a smartphone. Upon connection, that lighting unit's latent account number could be paired to an account in the service provider's backend system, based on the user logged in to the client-side application.

In some embodiments, a lighting unit may leave the production factory without a latent account number. An account number may be generated by an agent during the sales process to the end customer. The agent may generate the account number by sending an SMS message to the service provider's backend system containing an agent-specific code, or by generating an account number via the client-side application running on the smartphone. In the former case, the backend system replies to the SMS message with an appropriate account number based on which account is associated with the agent-specific code. The agent may then enters this account number into the client-side application by typing the account number into an entry field in the application, and the account number is tied to the lighting unit ID once the cable syncs the smartphone to lighting unit 102. In the latter case, the service provider's backend system can automatically detect whether an account number is paired with a specific lighting unit once the cable is connected between the smartphone and lighting unit 102. If no pairing exists, the client-side application can automatically prompt the service provider's backend system to tie a new account number to that lighting unit via the cable. That account number may be generated automatically based on the account paired with the application log-in information.

In some embodiments, a lighting unit may leave the production factory without a latent account number. The backend system may generate a specific set of account numbers for a specific agent in advance of sales, and those account numbers may be provided to the agent as a printed list. As the agent makes sales and/or takes pre-orders for products, the agent may assign a specific account number to a customer by entering the information on the printed list. The sales agent may then pair the account number to the hardware ID of the lighting unit given to the correct customer by entering the account number into the client-side application and connecting lighting unit 102 to a smartphone via the cable.

In some embodiments, a sales agent may be principally located at a central point (e.g., school), and use a smartphone to add money to customers' lighting units via the client-side application, when customers bring their lighting units to the central location.

In some embodiments, a sales agent may travel between geographic areas on a certain schedule, or perform door-todoor visits to customers, to add money to customers' lighting units using the client-side application on a smartphone.

In some embodiments, a smartphone with the client-side application and the cable may be bundled with the solar energy system so that customers can add money to their own lighting units via the client-side application on their own smartphones.

In some embodiments, the client-side application may be made widely available via a public conventional application store so that anyone that owns a smartphone in a community can add money to lighting units.

In some embodiments, customers may pay for energy from their lighting units through mobile money platforms. These payments may be made in advance of seeing an agent. The money may be credited in the backend system, and applied to the lighting unit whenever an agent transfers the payment data via the client-side application and cable.

In some embodiments, customers may pay for energy from their lighting units by using cash. A customer may give the cash to the agent, who then enters that cash amount into the client-side application through a dedicated cash-entry system. The cash amount may be credited to the customer's account number in the backend system, and the payment data is transmitted to the lighting unit via the client-side application and cable.

In some embodiments, a customer may have the flexibility to pay any amount for the down payment or only a fixed pre-determined amount. An account on the service provider's backend system may have a specific down payment amount associated with it. Any light that has not yet been registered, and that is connected to a smartphone running the client-side application with log-in information associated with an account with a fixed down payment, may automatically have that down payment applied to the lighting unit the first time it is connected to that smartphone. During bulk pre-sales, where cash down payments are collected from many customers at the same time, this method could streamline the cash collection and unit registration process.

Figure 4:
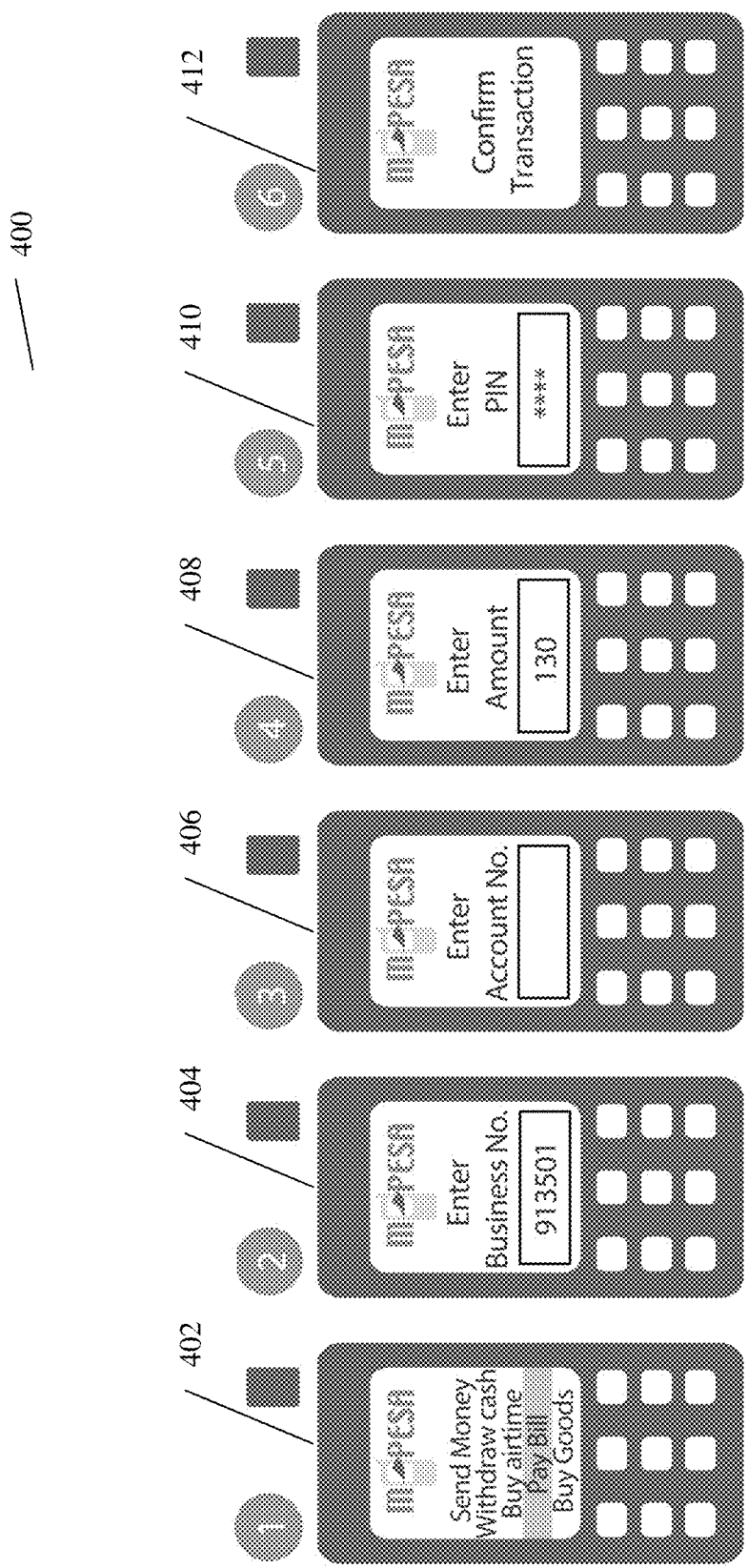
FIG. 4 is a flowchart showing a process to purchase energy credits through a mobile money infrastructure, according to some embodiments of the invention.

FIG. 4 is a flowchart showing a specific process 400 to purchase energy credits through a mobile money infrastructure, such as MPESA in Kenya. In some embodiments, payments are made through a communications or messaging protocol, such as USSD, SMS text messaging, SIM Application Toolkit (STK), or the like. The customer sends mobile money payments for energy credits to the service provider by transferring funds from their own or an agent's mobile money account, as detailed above. Cash payments for energy can also be logged via SMS or through an input field on the application on the smartphone to be stored on the service provider's backend system. These cash payments can be applied to lighting unit 102 in the same manner as previously described.

In step 402, an agent may initiate an electronic payment through a smartphone by opening the client-side application running thereon. In step 404, the agent may enter a business number that corresponds to the service provider. In step 406, the agent may enter his or her lighting unit 102 account number. In step 408, a payment amount may be entered. In step 410, the sender may enter a pin that authorizes the transaction. The payment amount may thus be deposited in the service provider's mobile money account. In step 412, a transaction confirmation receipt may be received by the smartphone. In some embodiments, the agent receives the receipt as an SMS text. In some embodiments, the mobile money payment may be sent from any phone or from any mobile money account, as long as the lighting unit 102's unique account number is entered during the transaction process to identify where the payment should be applied.

A backend software system of the service provider may acknowledge collection of the electronic payment and send data to a telephone number associated with the customer. In some embodiments, the data is encoded as analog AC signals. The cable is used to transmit the data to lighting unit 102. In some embodiments, the data comprises activation information and/or energy credits. The service provider activates lighting system 100 for a period of time and collects usage and diagnostic data therefrom. Lighting unit 102 may track energy credits usage and automatically deactivates when energy credits are depleted, unless additional energy credits are purchased.

D. Cable

Figure 5:
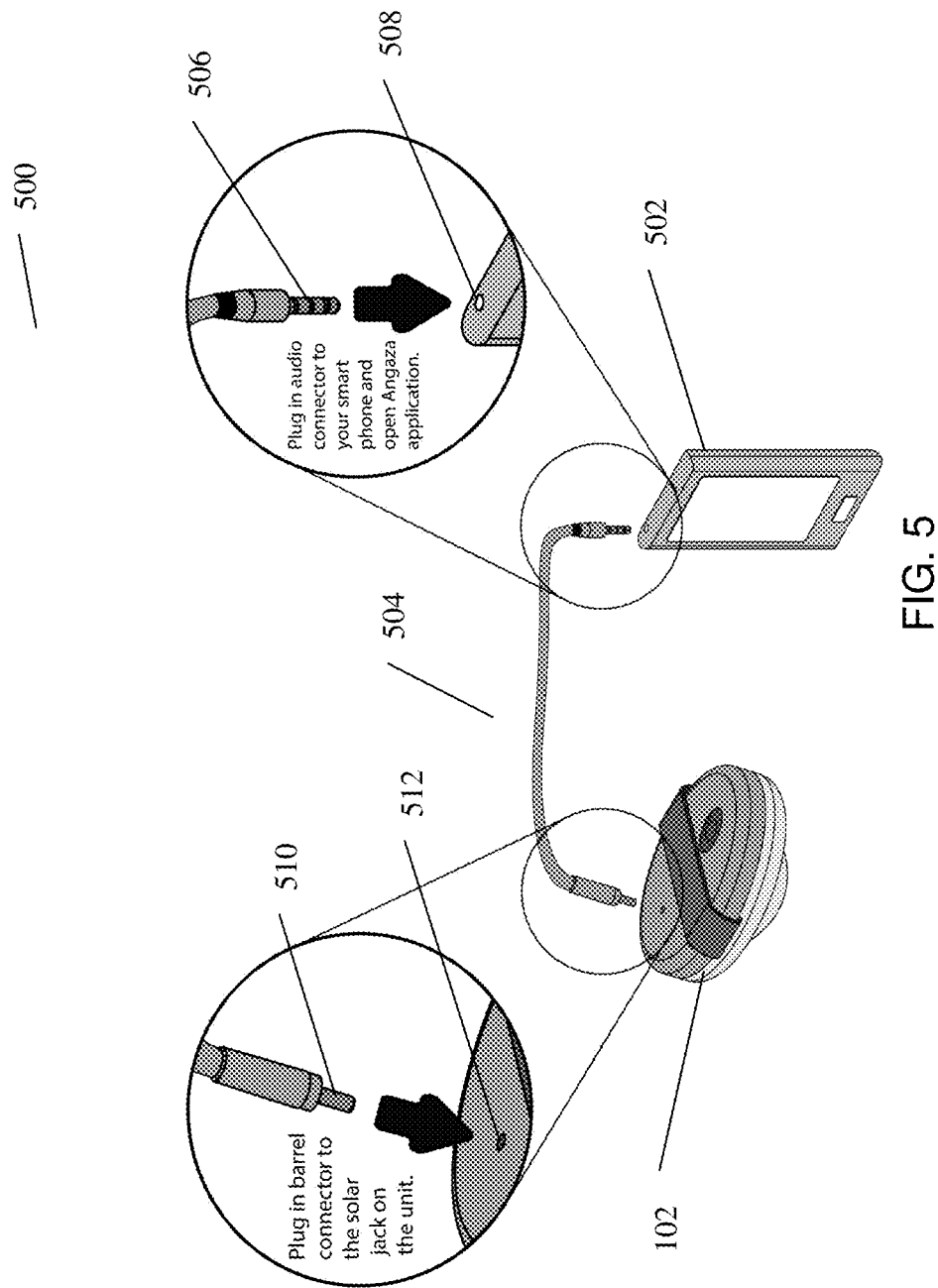
FIG. 5 is a diagram showing a lighting unit and a smartphone linked by a cable, according to some embodiments of the invention.

FIG. 5 is a diagram 500 showing lighting unit 102 and smartphone 502 linked by cable 504. Data cable 504 connects audio end 506 to jack 508 of smartphone 502 and connects photovoltaic (PV) end 510 to solar jack 512 of lighting unit 102. Consequently, solar jack 512 uses only two channels (conductors) to serve at least two purposes. A first purpose is to connect lighting unit 102 and solar charging unit 104 to charge the battery of lighting unit 102. A second purpose is to connect lighting unit 102 and smartphone 502 to communicate data between lighting unit 102 and the service provider, by operating smartphone 502. In some embodiments, the same cable 504 may be used for these two purposes, or different cables may be used.

Figure 6:
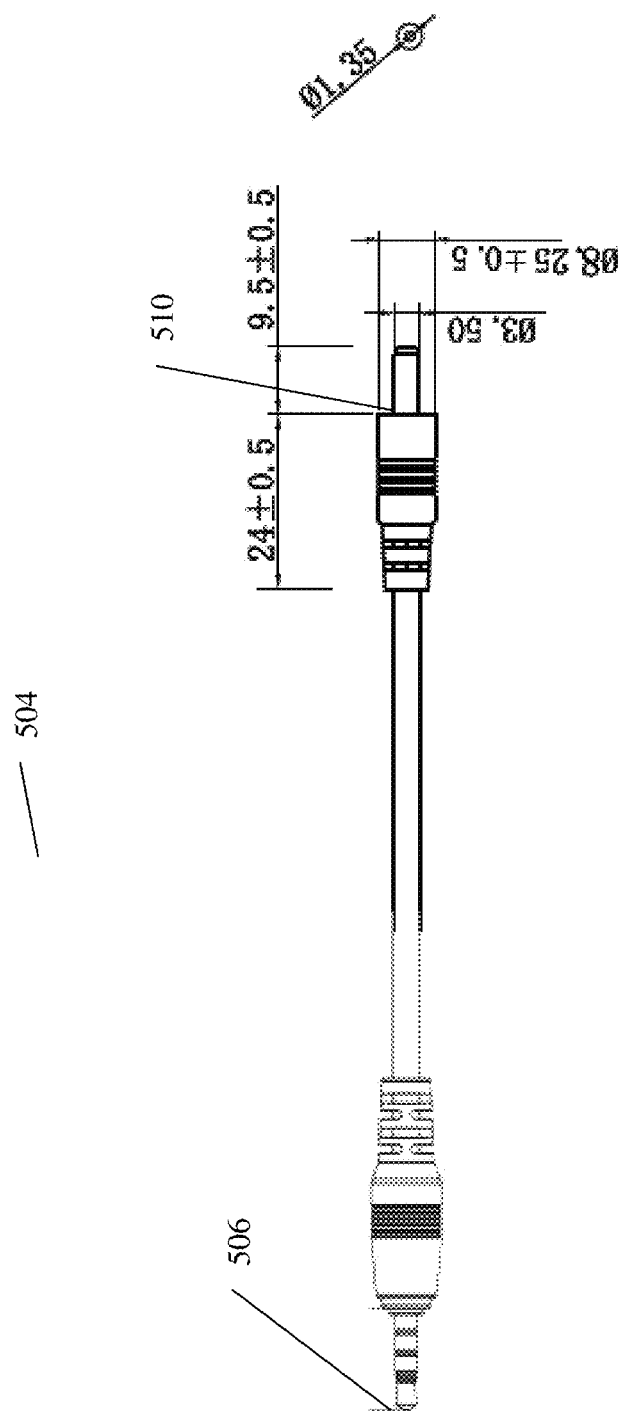
FIG. 6 is a diagram showing dimensions of a cable, according to some embodiments of the invention.

FIG. 6 is a diagram showing dimensions of cable 504, according to some embodiments. The embodiment shown in FIG. 6 includes audio end 506 and PV end 510. Audio end 506 connects to jack 508 of smartphone 502, and PV end 510 connects to solar jack 512 of lighting unit 102. The dimensions of cable 504 are not limited to those shown in FIG. 6. Cable 504 may provide an interface between lighting unit 102 and smartphone 502 to communicate analog AC signals that are processed by either device to manage and control the way lighting unit 102 operates.

Figure 7:
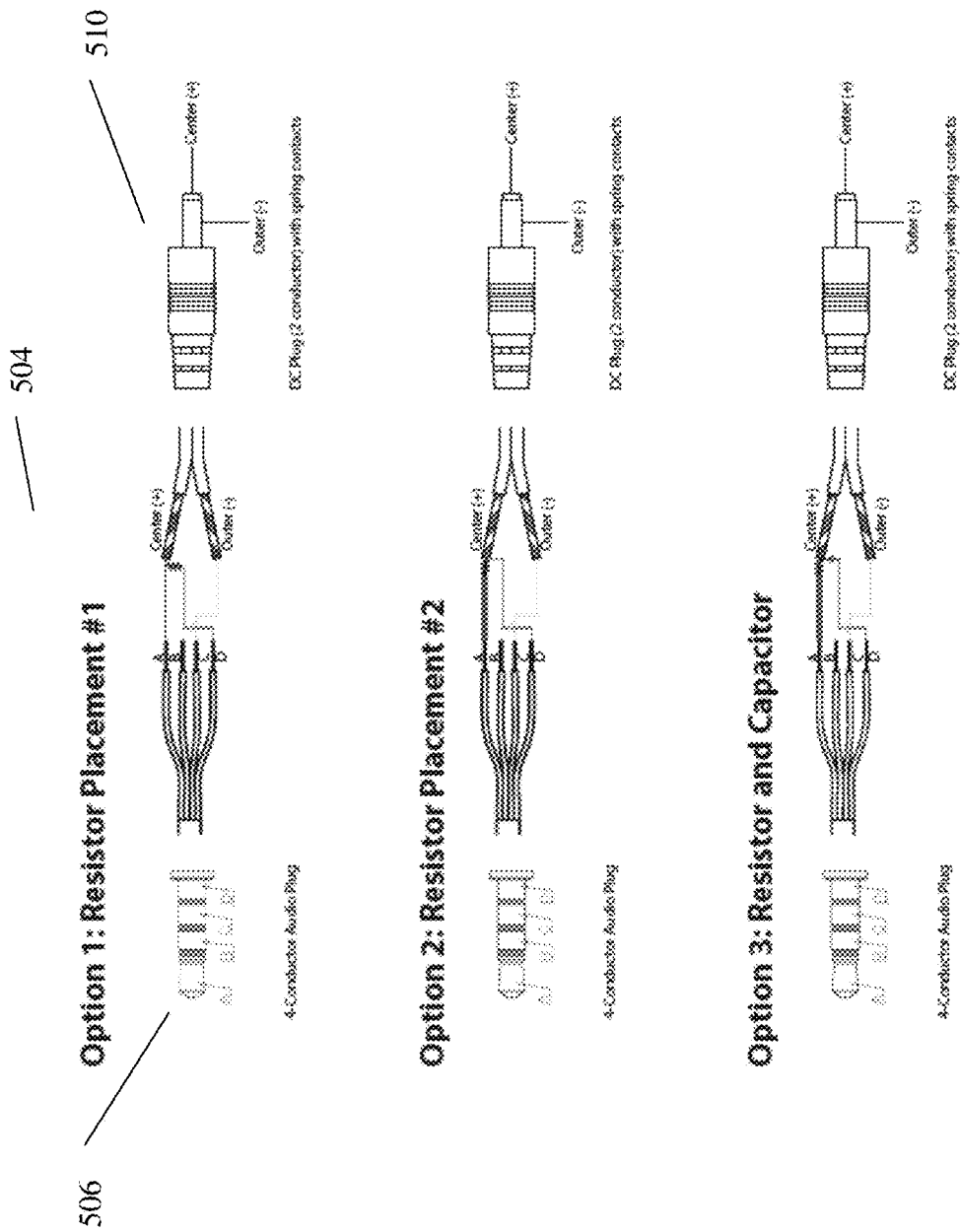
FIG. 7 includes diagrams of cables with different electrical connection configurations, according to some embodiments of the invention.

FIG. 7 is a diagram showing configurations of the electrical connections of various examples of cable 504. PV end 506 of cable 504 may include a connector configured to be inserted into solar jack 512 of lighting unit 102. In some embodiments, PV end 506 includes two channels, such as a center conductor and an outer conductor. The conductors are isolated via non-conducting material. In some embodiments, the center conductor forms a positive connection and the outer conductor forms a negative connection or ground. In some embodiments, PV end 506 of cable 504 is a DC plug with spring contacts that has a 3.5 mm outer diameter and 1.35 mm center pin.

In some embodiments, smartphone 502 is wired as Left Channel-Right Channel-Ground-Mic. This configuration is common to many smartphones. A smartphone which is wired in the alternate configuration, Left Channel-Right Channel-Mic-Ground, is the Tecno P3S. Some smartphones may require a "reverser" adapter which will reverse these last two pins to make them compatible with the same cable 504 configuration.

Audio end 506 of cable 504 includes a connector configured to be inserted into jack 508 of smartphone 502. Audio end 506 is, for example, a 4-conductor audio plug that includes conductors extending around a central axis of the connector and separated laterally between a sleeve portion and a tip portion. The conductors are labeled in FIG. 7 as A, B, C and D. In some embodiments, audio end 506 has a 3.5 mm outermost diameter and 26.6 mm for its length.

Embodiments of wiring configurations 1, 2 and 3 of cable 504 are shown in FIG. 7. According to option 1, conductor A of audio end 506 may be connected to the center positive conductor of PV end 506. Conductor B of audio end 506 may not be connected to either center or outer conductors PV end 506. Conductor C of audio end 506 may be connected to the outer conductor of PV end 506. Finally, conductor D of audio end 506 may be connected to the center conductor of PV end 506. In some embodiments, a resistor is inserted between conductors A and D of audio end 506, as close as possible to the PV end 506 side of cable 504. In some embodiments, a 4.7 k Ohms resistor may be used. In some embodiments, any resistor with a high resistance may be used, usually greater than 3 k ohms. In some embodiments, a capacitor in the range of 100 pF to 5 nF may be used instead of the resistor. Using the resistor or capacitor may avoid interfering with common headset signaling mechanisms and/or can provide some attenuation down to microphone signal levels and/or compensate for differences in audio hardware output impedance and/or compensate for differences in TX FET on resistance. In a second embodiment, option 2, the resistor is in series with A before it connects to D. This alternative design could minimize the differences in output impedance between different smartphones. According to a third embodiment, option 3, as a modified version of option 2, there is a capacitor in line with the microphone conductor. This eliminates the possibility of the microphone line falsely interpreting analog AC signal communication over the cable as a headset button is pressed.

System 500 may provide bidirectional communications over cable 504 between lighting unit 102 and smartphone 502 to transmit data collected by lighting unit 102 and receive data from the service provider to manage lighting unit 102. Lighting unit 102 may communicate with the service provider over a network that is linked to smartphone 502. A controller of lighting unit 102 may include a transceiver for managing the data encoded as AC signals. Using cable 504 eliminates the need for speakers and microphones to render signals that are transmitted between lighting unit 102 and smartphone 502. Moreover, using cable 504 decreases or may eliminate the need for noise reducing circuitry to distinguish data signals from audible background noise.

Figure 8:
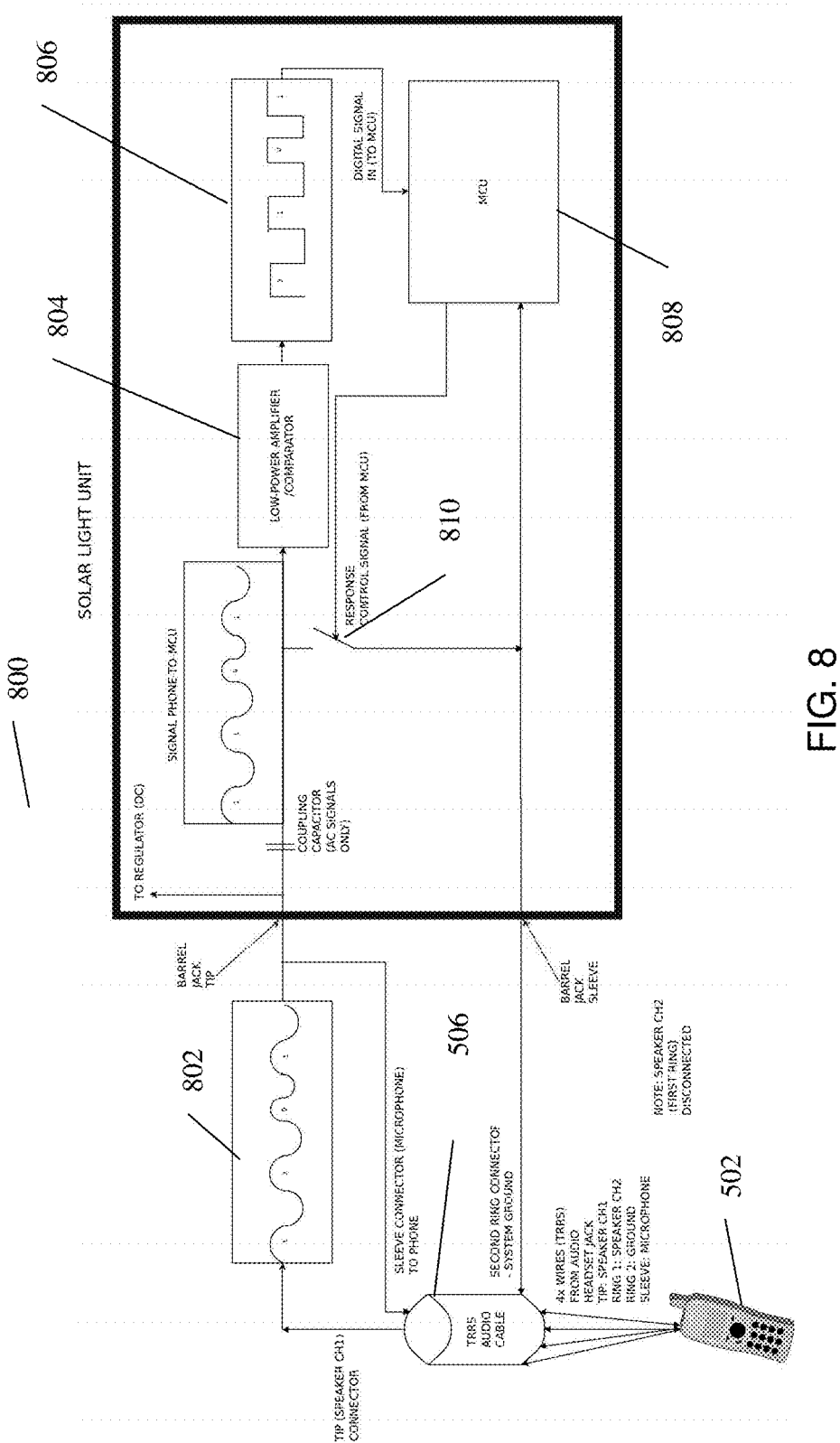
FIG. 8 is a diagram showing the processing of analog AC signals by a solar energy device, according to some embodiments of the invention.

FIG. 8 is a diagram showing analog AC signals from smartphone 502 that are processed by lighting unit 102. The electrical diagram 800 shows audio end 506 of cable 504 as a tip-ring-ring-sleeve (TRRS) audio cable. The tip may be a speaker signal conductor on a first channel and corresponds to conductor A of FIG. 7. The first ring may be adjacent to the tip conductor and corresponds to conductor B of FIG. 7. The first ring may be a speaker signal conductor that remains disconnected. The second ring may be adjacent to the first ring and corresponds to conductor C of FIG. 7. The second ring may be a ground signal conductor. The sleeve may be adjacent to the second ring and corresponds to conductor D of FIG. 7. The sleeve may be a microphone signal conductor.

Analog AC signal 802 may be transmitted through the tip conductor on a speaker channel to lighting unit 102. A coupling capacitor may function to separate a direct current (DC) PV input from solar charging unit 104 from an analog AC signal from smartphone 502. This allows for charging a battery of lighting unit 102 with solar charging unit 104 plugged into solar jack 512. The same solar jack 512 can be used to receive transmitted analog AC signals because the coupling capacitor inside lighting unit 102 may permit only analog AC signals to pass to microcontroller unit (MCU) 808.

A low-power amplifier/comparator 804 within lighting unit 102 may convert the analog AC signal received into digital signal 806. In some embodiments, amplifier/comparator 804 converts the analog AC signal (e.g., sine wave) to a digital signal (e.g., square pulse wave) by collapsing areas of the analog AC signal below a voltage toward ground (i.e., zero volts) and raising areas above a voltage toward a system voltage (e.g., 3 V).

MCU 808 decodes received messages by measuring a width of each digital pulse in a message including multiple pulses, by analysis in the frequency domain or by some other analysis method. Each pulse may correspond to a bit, and each pulse width (related to frequency) may determine a bit value, such as 0 or 1. Accordingly, MCU 808 or other hardware may demodulate, verify and act on messages sent by the service provider's backend software or a smartphone's software. The messages may be encoded as the analog AC signals as determined by the client-side application on smartphone 502. Likewise, MCU 808 may encode messages for transmission to smartphone 502 and/or service provider's backend software.

In some embodiments, a communication scheme enables simultaneous bidirectional communication over two conductors. A first path may employ frequency-shift keying (FSK) modulation in a first direction, and a second path may employ cooperative amplitude-shift keying (ASK) modulation in a second direction. In some embodiments, the second direction is opposite of the first direction. Accordingly, both schemes could be employed at the same time; that is, the slave side would modulate the message signal itself, rather than a carrier signal dedicated to the reply.

In some embodiments, cable 504 has a single conductor available for bidirectional communication between lighting unit 102 and smartphone 502 because the second conductor is tied to electrical ground. The client-side application on smartphone 502 may not be able to turn the speaker channel off so that lighting unit 102 can use the speaker channel for transmitting data to smartphone 502. This drawback is overcome by using firmware of MCU 808 to control specific time intervals for toggling switch 810. During intervals when switch 810 is toggled on, energy may be removed from an analog AC signal generated by smartphone 502, by redirecting it to ground. This pattern of lower-energy intervals can be detected by smartphone 502 through the microphone channel of audio jack 506 that is connected to the speaker channel inside cable 504, to listen to the speaker channel.

In some embodiments, a digital signal transmitted from MCU 808 controls digital switch 810 (e.g., FET) that is connected between the analog AC signal and ground, which may be established between the second ring of audio end 506 and MCU 808. When digital switch 810 is closed, it attenuates the carrier signal generated by smartphone 502. The phone detects these regions of attenuation, which occur in a deliberate pattern to convey information back to smartphone 502.

In some embodiments, MCU 808 includes a security mechanism to lock memory against reading and writing. In particular, firmware logic of MCU 808 controls a specific bit on MCU 808 that allows re-programming of MCU 808. Intentionally controlling this bit prevents reprogramming of MCU 808 to stop someone from hacking lighting unit 102 to receive free energy credits.

Lighting unit 102 may operate in different modes, including an inactive OFF mode and an active Communication Mode. Connecting cable 504 to smartphone 502 may automatically enable Communication Mode in lighting unit 102 to permit communications with other devices. Accordingly, this mode conserves processing power and battery life. In some embodiments, Communication Mode is enabled manually by using a switch on lighting unit 102 or on the application on smartphone 502.

The data signals may correspond to messages that include a preamble, body, and the like. Modulation schemes used to encode the messages into data signals may include FSK, ASK, PSK, or any combination thereof (e.g., QAM). In some embodiments, the messages may include other information, such as an authentication code and other fraud prevention features, as detailed in related U.S. application Ser. No. 13/722,197, the entire contents of which are incorporated herein by reference.

In some embodiments, hardware or firmware of lighting unit 102 tracks and stores usage and output data in a memory. Data may be relayed back to the backend software and subsequently erased within lighting unit 102, or stored therein indefinitely to be accessed at a later date.

E. Hybrid Cable

Some embodiments of the cable illustrated in FIGS. 7 and 8 above are designed to connect to a client device, for example a customer's smartphone, with a tip-ring-ring-sleeve (TRRS) audio cable connector in a Left Speaker Channel—Right Speaker Channel—Ground—Microphone configuration that conforms to a standard commonly referred to as CTIA. However, not all client devices conform to this standard. Another commonly used audio cable connection standard, commonly referred to as OMTP, swaps the ground and microphone connection on the TRRS connector for a Left Speaker Channel—Right Speaker Channel—Microphone—Ground configuration. In some embodiments, the cable described above is designed to connect to a client device with a TRRS audio cable connector in an OMTP configuration. Having a cable that conforms to only one of the standards, requires a user with a client device conforming to the other standard to obtain and use a separate converting connector that swaps the microphone and ground connections to convert from CTIA to OMTP or vice versa.

A hybrid cable can be used to connect both CTIA and OMTP conforming client devices to a two-wire interface such as that of the PAYG-enabled product described above. In some embodiments, the hybrid cable enables the same two-wire communication scheme by electrically coupling the ground and microphone signals so that the speaker signal from the client device is referenced against the same ground signal regardless of the orientation of the ground and microphone conductors. The electrical coupling of the ground and microphone signals can be achieved by bridging the ground and microphone conductors with a capacitor. The capacitor can be sized to ensure that the two channels are electrically connected at audio frequencies. In this way, the signal received from the client device on the speaker channel referenced against client device ground is approximately the same as that transmitted across the two-wire connection.

In certain embodiments, the hybrid cable enables transmission of the same microphone signal to the client device regardless of the ground-microphone configuration. Additionally, because a client device can detect a load on the microphone channel to determine that a microphone signal is present and thus enable recording of the signal, a resistor can be added between the microphone and ground conductors, which the client device interprets as the presence of a microphone. In certain embodiments, the hybrid cable includes a capacitor bridging the ground and microphone conductors and a resistor between the microphone and ground conductors.

Figure 9A:
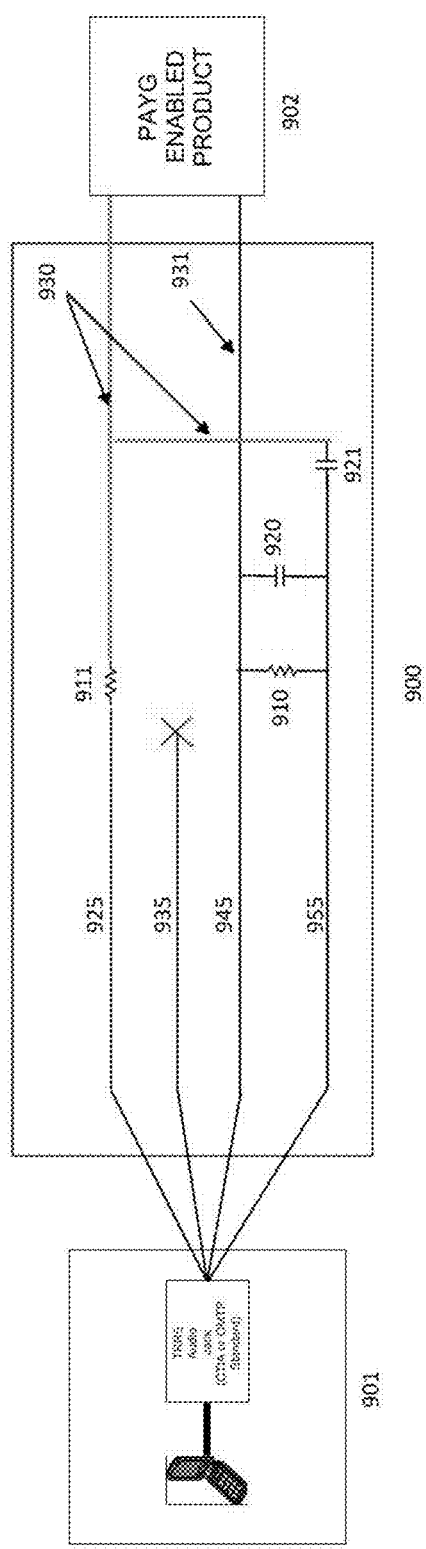
FIG. 9A is a diagram showing Standard TRRS audio connectors configured according to the CTIA and OMTP standards.

FIG. 9A is a diagram of one embodiment of a hybrid cable implementation. A device 901 capable of audio playback and recording using an integrated or auxiliary TRRS audio jack is connected to a PAYG-enabled product 902 (for example, lighting unit 102 shown in FIG. 1) using the hybrid cable 900. A cellphone and a smartphone are common, non-limiting examples of such a device 901.

Figure 9B:
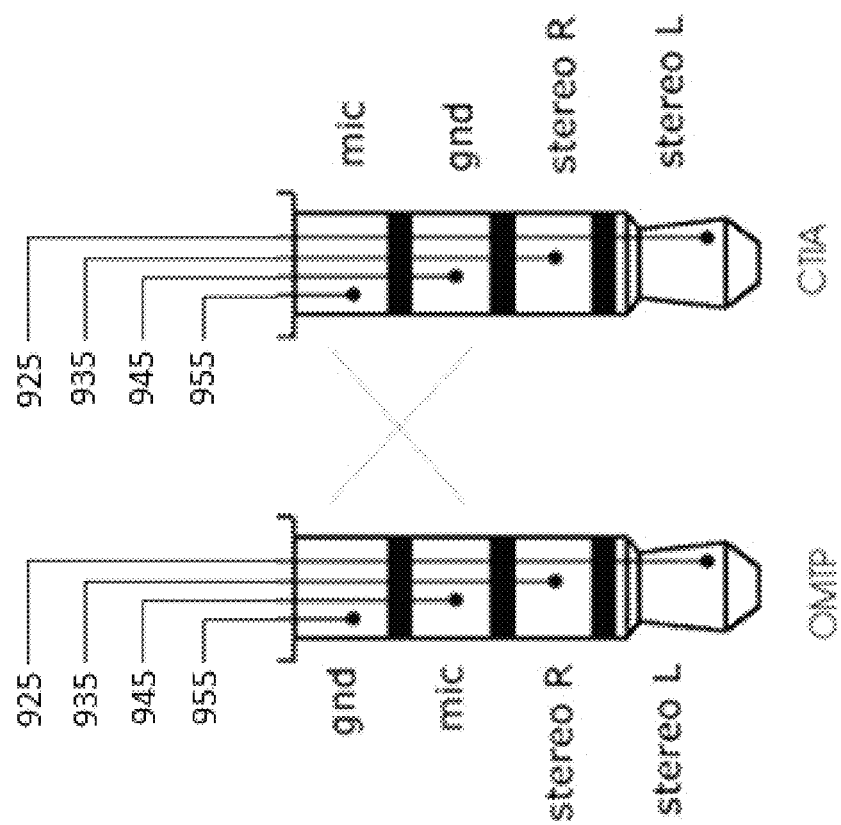
FIG. 9B is a diagram of a hybrid cable implementation

In the embodiment diagrammed in FIG. 9A, at the point of connection with the audio TRRS jack in device 901, the four conductors 925, 935, 945, and 955 of hybrid cable 900 terminate in a standard TRRS audio connector that plugs into the audio jack in device 901. Standard TRRS audio connectors configured according to the CTIA and OMTP standards are illustrated in FIG. 9B. Signals that are carried in cable 900 are defined by which audio jack standard device 901 implements. The CTIA and OMTP standards illustrated in FIG. 9B are outlined below:

Conductor 925 carries Left Channel Audio Output (CTIA and OMTP)

Conductor 935 carries Right Channel Audio Output (CTIA and OMTP)

Conductor 945 carries GROUND (CTIA) or Microphone Input (OMTP)

Conductor 955 carries Microphone Input (CTIA) or GROUND (OMTP)

Referring to FIG. 9A, conductor 925 is used to transmit an audio signal carrying data from device 901 to PAYG-enabled product 902. PAYG-enabled product 902 has internal signal processing circuitry described elsewhere in this specification that does not depend on the implementation of cable 900. Resistor 911 separates conductor 925 from the "Cable-Based PAYG Signal Bus" 930, which is used in a "one wire" communication scheme for bidirectional signal transmission. Resistor 911 allows circuitry within PAYG-enabled product 902 to send signals more effectively onto bus 930 by providing a level of electrical separation between conductor 925 and bus 930. In certain embodiments, resistor 911 is less than or equal to 100 ohms.

The signal on bus 930 is electrically referenced against a "PAYG Product Ground" 931. Physically, the connection from bus 930 and PAYG Product Ground 931 within cable 900 to PAYG-enabled product 902 can be made using a two-conductor terminal that may take the form of a barrel jack, where bus 930 is connected to the tip of the barrel jack, and PAYG Product Ground 931 is connected to the sleeve of the barrel jack.

In cable 900, resistor 910 connects conductors 945 and 955. The device 901 interprets resistor 910 as a signal that a recording device or microphone is present. This ensures that device 901 will properly enable internal recording hardware so that audio signals in cable 900 are recorded for analysis. In some embodiments, resistor 910 may be preferably sized at 3.3 kOhms to 9.1 kOhms, depending on the requirements for microphone presence detection. Device 901 will record audio data from the microphone input on conductor 945 or 955, depending on which audio standard the device 901 implements.

Capacitor 920 connects conductors 945 and 955. In some embodiments, capacitor 920 has a large capacitance value, ensuring that conductors 945 and 955 are electrically connected at audio frequencies. In some embodiments, capacitor 920 is preferably sized between 10 microFarads and 100 microFarads. The signal from device 901 to PAYG-enabled product 902 that is sent out through conductor 925 is at a voltage that is referenced against device 901 ground, which is either on conductor 945 or 955 depending on whether the device 901 implements the CTIA or OMTP standard.

Capacitor 920 ensures that regardless of whether CTIA or OMTP is used, the signal that reaches PAYG-enabled product 902 through bus 930, referenced against PAYG Product Ground 931, is of approximately the same voltage that is sent out on conductor 925, with reference to device 901 ground (conductor 945 or 955 depending on the standard). Capacitor 920 is a significant component in allowing the cable to be used with both CTIA and OMTP devices.

Capacitor 921 connects conductor 955 to the Cable-Based PAYG Signal Bus 930 at high impedance with respect to the bus signal frequency. In some embodiments, capacitor 921 is sized between 0.1 and 10,000 nanoFarads. In some embodiments, capacitor 921 is preferably sized at approximately 1 nanoFarad. Electrically, this allows a very small percentage of the signal present on bus 930 to reach conductor 955, which is then coupled into the microphone input of device 901 on conductor 955 or 945. Conductors 945 and 955 are electrically identical to one another due to the presence of capacitor 920.

Conductor 935 typically carries the Right channel of a stereo audio signal, and is unused in the "Hybrid Cable-Based PAYG" communication cable configuration shown in FIG. 9A. However, in some embodiments, conductor 935 may be used as a differential signaling line in combination with conductor 925. Differential signaling allows the transmission of information electrically with two complementary signals sent on two paired wires. The information is contained in the difference between the respective signals. Because external interference (electromagnetic noise) tends to affect both wires together, and information is sent only by the difference between the wires, the technique improves resistance to electromagnetic noise compared with use of only one wire and an un-paired reference (ground). Differential signaling allows for larger voltages to be applied to PAYG-enabled product 902, for purposes of either providing PAYG-enabled product 902 with a sufficient voltage to insert a small amount of charge into the battery, or for enabling differential data signaling between device 901 and PAYG-enabled product 902 in scenarios where noise sensitivity is required. In these scenarios, conductors 945 and 955 may or may not be connected, but an electrical connection from conductor 935 to PAYG-enabled product 902 is made. In some embodiments, capacitors with low impedance at audio frequencies (1 microFarad to 100 microFarads) may be placed inline with conductors 925 and 935, and a microphone detection resistor may connect conductors 945 and 955. After passing through the coupling capacitor, the signal from 925 would enter the "PAYG Signal Bus" 930, and the signal from 935 would connect to "PAYG Product Ground" 931. Additionally, conductors 945 and 955 may be connected to the "PAYG Signal Bus" 930 and the "PAYG Product Ground" 931, respectively. This configuration allows for client devices with either OMTP or CTIA audio jack pinouts to record signals from the "PAYG Signal Bus" 930.

Figure 10:
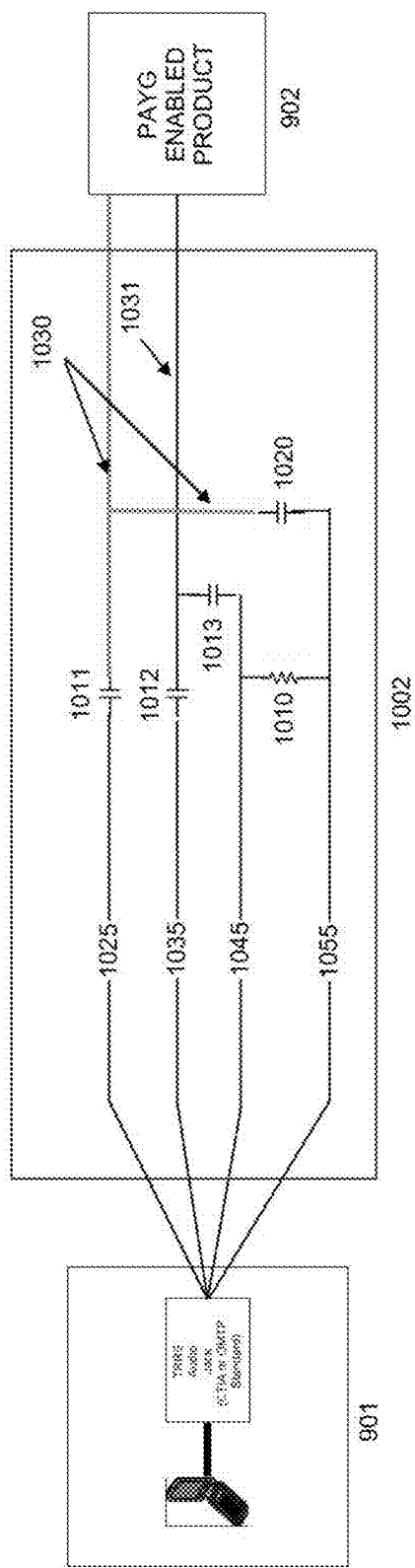
FIG. 10 is a diagram showing a hybrid cable implementation for differential signaling.

FIG. 10 is a diagram of one embodiment of a hybrid cable implementation configured for differential signaling. In this embodiment, differential signals may be carried in conductors 1025 and 1035 of cable 1002. In some embodiments, capacitors 1011 and 1012 are greater than 0.1 microFarad and less than 250 microFarads 0.1 microFarad and less than 220 microFarads, and capacitors 1013 and 1020 are greater than 100 picoFarads and less than 1000 microFarads. In some embodiments, capacitors 1011 and 1012 are preferably greater than 1 microFarad and less than 220 microFarads and capacitors 1013 and 1020 are preferably greater than 1000 picoFarads and less than 100 microFarads. The audio signals carried in conductors 1025 and 1035 can be transmitted to conductors 1030 and 1031, while DC components of the output signal may be blocked by capacitors 1011 and 1012. Depending on the audio standard (OMTP or CTIA) used by device 901, conductors 1045 and 1055 may be connected to ground or microphone input, with respect to the audio circuitry inside of device 901. This ground is not directly transmitted to PAYG product 900 in this particular embodiment, and capacitors 1013 and 1020 can ensure that one-half of the differential signal seen by PAYG-enabled product 902 will be recorded into the microphone input of device 901. In some embodiments, resistor 1010 is greater than 2 kOhms and less than 20 kOhms to ensure that device 901 microphone detection circuitry is activated. In some embodiments, resistor 1010 is preferably greater than 3 kOhms and less than 10 kOhms to ensure that device 901 microphone detection circuitry is activated.

The embodiments described herein are not an exhaustive representation of possible configurations or uses. Persons skilled in the art would understand that these concepts could be applied to additional systems, devices and methods. The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications, without departing from the spirit and scope of the invention.

For example, in some embodiments, a different combination of cable, electrical design, and software may permit a mobile device to communicate with the PAYG hardware. In some embodiments, a Universal Serial Bus (USB) cable, connectors, jacks, and associated protocol may be used. In some embodiments, the cable may be replaced with a method for short-range wireless communication, such as BLUETOOTH, between the mobile device and PAYG hardware. Thus, this invention is not intended to be limited to the embodiments shown, but is to be accorded the widest scope consistent with the principles and features disclosed herein. Finally, the entire disclosure of the patents and publications referred in this application are incorporated herein by reference.

The invention claimed is:

1. A method of managing a plurality of pay-as-you-go apparatuses, comprising:
   receiving a payment message at a server, wherein the payment message is sent from a mobile device;
   transmitting an encoded data message from the server to the mobile device, wherein the encoded data message is for a pay-as-you-go apparatus; and
   receiving a data message at the server from the mobile device, wherein the received data message comprises data extracted from the pay-as-you-go apparatus using a cable that connects the pay-as-you-go apparatus to an audio jack of the mobile device;
   wherein the pay-as-you-go apparatus comprises:
      a jack configured to receive electrical power generated by a solar panel and facilitate bidirectional communications between the pay-as-you-go apparatus and the mobile device;
      a switch controlled by a microcontroller to attenuate a signal transmitted by the mobile device during periodic time intervals, wherein the mobile device detects the attenuation through a microphone channel that is connected to a speaker channel of the cable connected to the jack of the pay-as-you-go apparatus;

an amplifier that converts an analog signal received from the mobile device into a plurality of digital pulses by collapsing areas of the analog signal that are below a first voltage threshold and raising areas of the analog signal that are above a second voltage threshold, wherein the microcontroller decodes the encoded data message transmitted from the server to the mobile device by measuring a width of a digital pulse to determine a bit value.

2. The method of managing a plurality of pay-as-you-go apparatuses of claim 1, wherein:

the mobile device is operated by an agent that collects a plurality of payments from a plurality of customers, and the pay-as-you-go apparatus is associated with one of the plurality of customers.

3. The method of managing a plurality of pay-as-you-go apparatuses of claim 1, wherein the bidirectional communications are transmitted over a single conductor of the cable by employing the switch to permit transmission in a first direction when the switch is in a first position and permit transmission in a second direction, opposite the first direction, when the switch is in a second position.

4. The method of managing a plurality of pay-as-you-go apparatuses of claim 1, wherein a first cable is used to connect the pay-as-you-go apparatus to the solar panel and a second cable is used to connect the pay-as-you-go apparatus to the mobile device, the first and second cables being different or combined.

5. The method of managing a plurality of pay-as-you-go apparatuses of claim 2, further comprising:

transmitting information from the mobile device to an electronic money system, wherein the information comprises service provider identification information, a customer account, and a payment amount; and authorizing deduction of the payment amount from an account that is associated with the agent or customer.

6. The method of managing a plurality of pay-as-you-go apparatuses of claim 3, wherein frequency-shift keying (FSK) modulation is employed for transmission in the first direction, and cooperative amplitude-shift keying (ASK) modulation is employed for transmission in the second direction.

7. A method of managing a plurality of pay-as-you-go apparatuses, comprising:

receiving a payment message at a server, wherein the payment message is sent from a mobile device;

transmitting an encoded data message from the server to the mobile device, wherein the encoded data message is for a pay-as-you-go apparatus; and receiving a data message at the server from the mobile device, wherein the received data message comprises data extracted from the pay-as-you-go apparatus using a cable that connects the pay-as-you-go apparatus to an audio jack of the mobile device;

wherein the pay-as-you-go apparatus comprises a jack configured to receive electrical power generated by a solar panel and facilitate bidirectional communications between the pay-as-you-go apparatus and the mobile device;

wherein a first cable is used to connect the pay-as-you-go apparatus to the solar panel and a second cable is used to connect the pay-as-you-go apparatus to the mobile device, the first and second cables being different or combined;

wherein the second cable comprises:

a first end configured to connect to the jack of the pay-as-you-go apparatus and comprising only two conductors; and a second end configured to connect to an audio jack of the mobile device and comprising three or more conductors.

8. The method of managing a plurality of pay-as-you-go apparatuses of claim 7, wherein the first end is a photovoltaic plug.

9. The method of managing a plurality of pay-as-you-go apparatuses of claim 8, wherein the second end is a tip-ring-ring-sleeve (TRRS) connector.

10. A method of managing a plurality of pay-as-you-go apparatuses, comprising:

receiving a payment message at a server, wherein the payment message is sent from a mobile device;

transmitting an encoded data message from the server to the mobile device, wherein the encoded data message is for a pay-as-you-go apparatus; and receiving a data message at the server from the mobile device, wherein the received data message comprises data extracted from the pay-as-you-go apparatus using a cable that connects the pay-as-you-go apparatus to an audio jack of the mobile device;

wherein the pay-as-you-go apparatus comprises a jack configured to receive electrical power generated by a solar panel and facilitate bidirectional communications between the pay-as-you-go apparatus and the mobile device;

wherein a first cable is used to connect the pay-as-you-go apparatus to the solar panel and a second cable is used to connect the pay-as-you-go apparatus to the mobile device, the first and second cables being different or combined; and wherein the pay-as-you-go apparatus comprises:

a microprocessor configured to produce and interpret analog AC signals for communicating with the server through the second cable connected to the mobile device; and a power module configured to provide power to a device, wherein the device comprises a lighting unit or an electrical outlet.

11. The method of managing a plurality of pay-as-you-go apparatuses of claim 10, wherein the pay-as-you-go apparatus is configured to communicate with the provider system using an application on the mobile device.

12. A method of managing a plurality of pay-as-you-go apparatuses, comprising receiving a payment message at a server, wherein the payment message is sent from a mobile device;

transmitting an encoded data message from the server to the mobile device, wherein the encoded data message is for a pay-as-you-go apparatus; and receiving a data message at the server from the mobile device, wherein the received data message comprises data extracted from the pay-as-you-go apparatus using a cable that connects the pay-as-you-go apparatus to an audio jack of the mobile device;

wherein the cable comprises:

an input connector comprising:

a first conducting portion for transmitting a first signal;

a second conducting portion for transmitting a second signal or a ground signal; and a third conducting portion for transmitting the second signal or the ground signal;
an output connector comprising:
a fourth conducting portion for transmitting the first signal; and
a fifth conducting portion for transmitting the ground signal; and
a circuit electrically connecting the first conducting portion to the fourth conducting portion and the first and second conducting portions to the fifth conducting portion, wherein the circuit is configured to transmit a ground signal from the second or third conducting portions to the fifth conducting portion.

13. The method of managing a plurality of pay-as-you-go apparatuses of claim 12, wherein the second signal is a microphone signal.

14. The method of managing a plurality of pay-as-you-go apparatuses of claim 12, wherein the circuit is configured to transmit the second signal as a portion of the first signal.

15. The method of managing a plurality of pay-as-you-go apparatuses of claim 12, wherein the input connector further comprises a sixth conducting portion for transmitting a differential signal with the first conducting portion.

16. The method of managing a plurality of pay-as-you-go apparatuses of claim 12, wherein:
the first conducting portion and the third conducting portion are electrically connected to the fourth conducting portion; and
the second conducting portion is directly electrically connected to the fifth conducting portion.

17. A system for managing a plurality of pay-as-you-go apparatuses comprising:
one or more processors;
memory; and
one or more programs, wherein the one or more programs are stored in the memory and configured to be executed by the one or more processors, the one or more programs including instructions for:
receiving a payment message sent from a mobile device;
transmitting an encoded data message to the mobile device, wherein the encoded data message is for a pay-as-you-go apparatus; and
receiving a data message from the mobile device, wherein the received data message comprises data extracted from the pay-as-you-go apparatus using a cable that connects the pay-as-you-go apparatus to an audio jack of the mobile device;
wherein the pay-as-you-go apparatus comprises:
a jack configured to receive electrical power generated by a solar panel and facilitate bidirectional communications between the pay-as-you-go apparatus and the mobile device;
a switch controlled by a microcontroller to attenuate a signal transmitted by the mobile device during periodic time intervals, wherein the mobile device detects the attenuation through a microphone channel that is connected to a speaker channel of the cable connected to the jack of the pay-as-you-go apparatus.
an amplifier that converts an analog signal received from the mobile device into a plurality of digital pulses by collapsing areas of the analog signal that are below a first voltage threshold and raising areas of the analog signal that are above a second voltage threshold, wherein the microcontroller decodes the encoded data message transmitted from the server to the mobile device by measuring a width of a digital pulse to determine a bit value.

* * * * *